United States Patent
Franklin

(10) Patent No.: US 6,792,967 B1
(45) Date of Patent: Sep. 21, 2004

(54) SHUTOFF VALVE SYSTEM WITH LEAK DETECTOR

(76) Inventor: Robert C. Franklin, 15400 Winchester Blvd. #42, Los Gatos, CA (US) 95030

(*) Notice: Subject to any disclaimer, the term of this patent is extended or adjusted under 35 U.S.C. 154(b) by 0 days.

(21) Appl. No.: 10/712,334

(22) Filed: Nov. 13, 2003

(51) Int. Cl.⁷ .......................... F16K 17/00; G01M 3/00; G01M 3/04
(52) U.S. Cl. ........................ 137/312; 73/40.5 R; 73/46; 122/504; 122/507; 137/67; 137/68.11; 251/74; 251/294; 285/13
(58) Field of Search .............................. 137/67, 68.11, 137/75, 312, 387; 122/504, 507; 222/52, 54; 251/73, 74, 142, 294; 285/13; 340/605; 73/40.5 R, 46

(56) References Cited

U.S. PATENT DOCUMENTS

| | | | |
|---|---|---|---|
| 1,993,666 A | * 3/1935 | Hornell | 137/67 |
| 2,798,503 A | 7/1957 | Carver | 137/312 |
| 3,920,031 A | 11/1975 | Maxfield | 137/312 |
| 4,294,276 A | * 10/1981 | Harrison | 137/67 |
| 4,324,268 A | * 4/1982 | Jacobson | 137/312 |
| 5,193,780 A | * 3/1993 | Franklin | 251/74 |
| 5,632,302 A | 5/1997 | Lenoir | 137/312 |
| 5,713,387 A | * 2/1998 | Armenia et al. | 137/312 |
| 5,771,916 A | * 6/1998 | Armenia et al. | 137/312 |
| 5,992,218 A | * 11/1999 | Tryba et al. | 73/40.5 R |
| 6,024,116 A | 2/2000 | Almberg et al. | 137/312 |
| 6,186,162 B1 | * 2/2001 | Purvis et al. | 137/312 |
| 6,634,375 B2 | * 10/2003 | Olivas et al. | 137/67 |

* cited by examiner

*Primary Examiner*—George L. Walton
(74) *Attorney, Agent, or Firm*—Robert Charles Hill

(57) ABSTRACT

A latched, spring loaded valve having a water sensor and an activation mechanism shuts off water supply, when a water leak is detected, to specific application as cloths washing machines, dishwashing machines, sinks, toilets, and refrigerators equipped with ice makers. The shutoff valve system with leak detector has a sealing member movable with a valve body between an open position and a closed position wherein the sealing member blocks fluid flow.

10 Claims, 5 Drawing Sheets

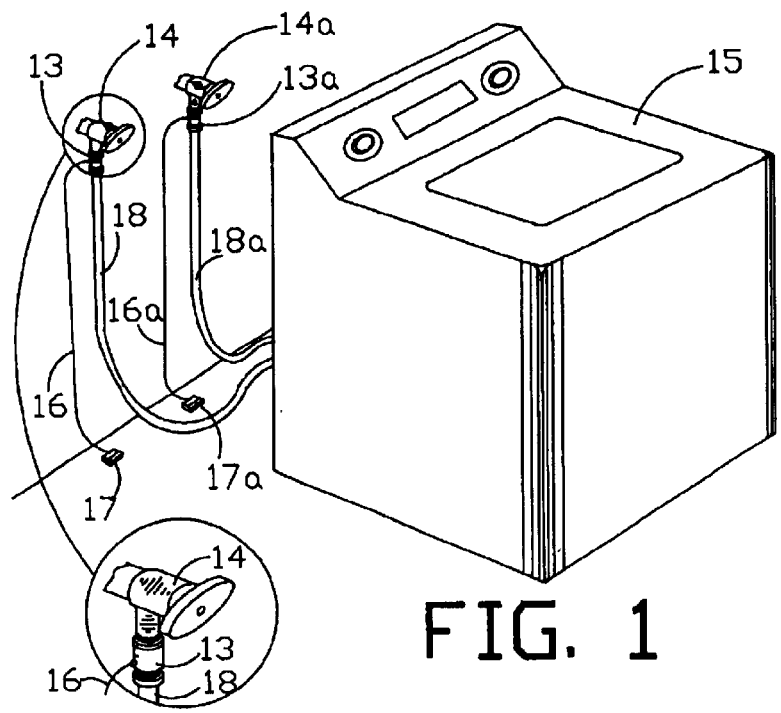
FIG. 1
FIG. 1A
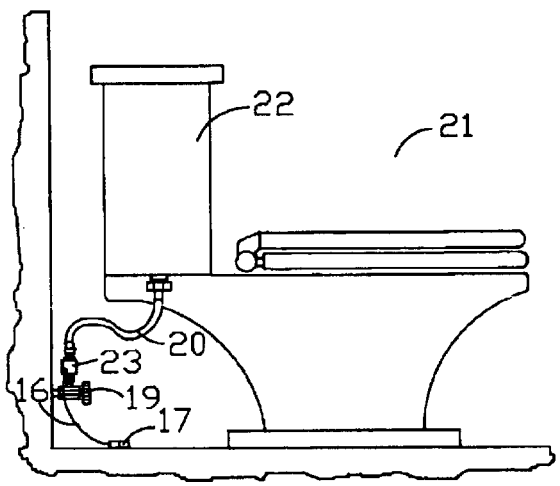
FIG. 2
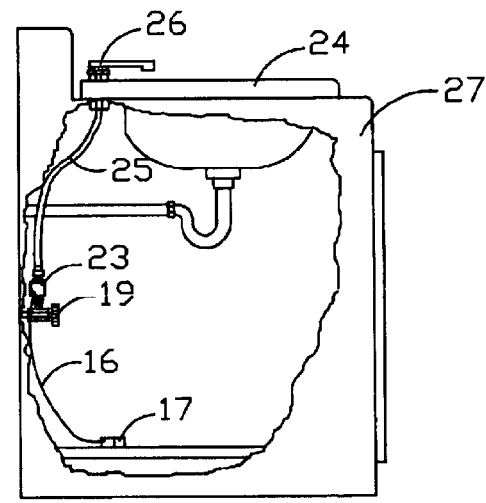
FIG. 3

SHUTOFF VALVE SYSTEM WITH LEAK DETECTOR

BACKGROUND OF INVENTION

1. Field of Invention

This invention relates to a valve system that detects the presence of a water leakage and turns off an associated valve in order to stop the flow of the water, thus avoiding significant property damage. More particularly the invention pertains to such applications as clothes washing machines, dishwashing machines, toilets, sinks, and refrigerators equipped with ice cube makers, which occasionally are the source of water leaks due to broken hoses, faulty water level detectors, and the like.

Insurance companies have recently disclosed that water damage claims exceed fire damage claims. This emphasizes the need for the preventive measures that are provided by this invention. Since the invention does not require any electronic circuitry or complex mechanical devices to function, it provides a cost-effective and reliable means of turning off the source of water leakage.

2. Description of Prior Art

There are numerous water leak detection systems, most of which involve the use of an electronic means for sensing the presence of fluids such as water. The sensor elements of such systems typically involve measuring the conductivity of the water and use such a detection means to energize a solenoid or other such device to turn off an associated water valve. Not only does the electronic circuitry add cost and reduced reliability, it also requires the presence of electrical power to function. If a water leak occurs coincidentally with an electrical power outage, the valve will fail to accomplish its purpose, unless auxiliary power is supplied.

There are several prior art patents that provide water shutoff protection utilizing a water sensor that changes physical properties when placed in contact with water, thereby activating a valve shutoff device. Upon review it will become evident that these patents are intended for use on water heaters. Installation of such shutoff devices requires plumbing skills such as cutting into the existing water source pipe and soldering the new valve device in place or installing the necessary threaded fittings to accommodate the new valve. In many locations it would involve hiring a licensed plumber to comply with local building codes. The cost and complexity of such an installation often is a deterrent to undertaking the project. As will be seen by the following disclosure the proposed water shutoff system of the present invention is intended for use on the indicated appliances such as clothes washing machines, etc. and can be easily installed. Since no knowledge of plumbing skills is required, this invention would lend itself to do-it-yourself installation.

One device described in U.S. Pat. No. 2,798,503, dated Jul. 9, 1957, issued to Carver et al, utilizes a water softenable link that dissolves when coming in contact with water leaking from a water heater into an associated drip pan. As described, the cable attaching the water softenable link to the shutoff valve must be positioned directly beneath the shutoff valve so that the sofltenable link can be anchored in the drip pan. While appropriate for this installation it would not provide the flexibility to be applicable on other applications.

Another device described in U.S. Pat. No. 3,920,031, dated Nov. 18, 1975, issued to Maxfield provides a water shutoff device associated with a water heater application. The water detection means involves the use of a water-soluble material held in compression by a spring. The water detection means is placed in a drip pan that surrounds the base of the water heater such that, as water leaks from the faulty water heater, it will reach a level to dissolve the detection means which in turn releases a spring driven valve that is plumbed into the water supply line of the water heater.

Another device described in U.S. Pat. 5,632,302, dated May 27, 1997, and issued to Robert M. Lenoir, Jr. provides two different means of specifically dealing with water heater leakage. One means involves the use of an electrical sensor to detect the presence of water leakage specifically from a water heater in order to activate a solenoid to turn off an associated water valve located in the cold water input pipe of the water heater. A second described means involves the use of a thin, dissolvable strip, which is in tension, and dissolves in the presence of water thus releasing a spring mechanism which, in turn, activates a spring loaded valve specifically located in the cold water input pipe of a water heater. There are two basic drawbacks to this second means as described. First, the use of a standard ball valve in such an application requires the use of a spring-loaded valve with a very strong spring. Ball valves typically involve full contact seals such as O-rings on both the inlet and outlet sides of the rotating ball. These O-rings produce a great deal of pressure on the ball, thus requiring inordinate rotational torque to close the valve, making the valve reliability questionable. Second, the dissolvable strip as described in the invention is shown in tension. Most such materials, which might be used as described, are composed of a water soluble, crystalline structure that exhibits poor tensile strength, thus making it unreliable and subject to premature failure. As will be seen later, the present invention overcomes the above shortcomings and provides an easily installed system for water and, where applicable, non-water water systems.

Yet another U.S. Pat. No. 6,024,116, dated Feb. 15, 2000, issued to Almberg et al, again deals specifically with water leak detection in water heater applications. It provides a water softenable latch that, when exposed to water, will release a valve mechanism from its open to closed state thus turning off the water supply. In addition the invention turns off the gas supply to the water heater.

Most prior art found addresses the subject of water leak conditions as they pertain to water heaters. The following invention description pertains more specifically to use with clothes washing machines, dishwashing machines, toilets, sinks, and refrigerators equipped with ice cube makers that often use flexible hoses in their individual applications.

SUMMARY OF THE INVENTION

This invention provides a simple, reliable means of detecting and shutting off the source of most common water leaks involved with clothes washers, dishwashers, toilets, sinks, and refrigerators equipped with ice cube makers by utilizing a spring loaded shutoff valve in conjunction with a water sensor. Although the following invention description focuses primarily on those appliance applications listed above, which involve water leakage, it could likewise apply to other applications involving the use of other non-water fluids, where applicable. As will be seen later, the valve described in this invention utilizes a flow-through central element that allows water to flow through its central opening in normal operation but closes the water flow patly when activated to its closed condition. The use of this flow-through central element, in conjunction with a water sensor and activation mechanism, provides a compact, simple water shutoff device. The use of this valve does not preclude the use of other types of valves by those skilled in the art to accomplish the goals of this invention.

The water sensor described in this invention utilizes a water-soluble substance in a compression mode. Other methods for containing the water-soluble material, for example, in a bending, torsion, or tension mode, as devised by those skilled in the art, should not detract from the spirit of this invention. The water-soluble substance could be composed of such materials as sugar, salt, or the like. These materials exhibit relatively high strength in compression when dry and lose most if not all of that strength when exposed to a fluid such as water. As will be shown later with regard this invention, a spring maintains pressure against the water-soluble substance and will initiate a closure of the associated valve when the water-soluble substance dissolves. The substance used in several experiments has been sugar. It is very strong in compression, very soluble in water, easily shaped and inexpensive.

DESCRIPTION OF THE DRAWINGS

FIG. 1 shows a typical clothes washing machine installation with water sensors and shutoff valves located in the inlets to the hose lines.

FIG. 1A shows an enlargement of an area of FIG. 1 to provide a more detailed depiction of the shutoff valve installation.

FIG. 2 shows a typical toilet installation with a water sensor and shutoff valve located at the inlet to the flexible hose line.

FIG. 3 shows a partial cutaway of a typical sink installation with a water sensor and shutoff valve located at the inlet to the flexible hose line.

DETAILED DESCRIPTION

Figure 4:
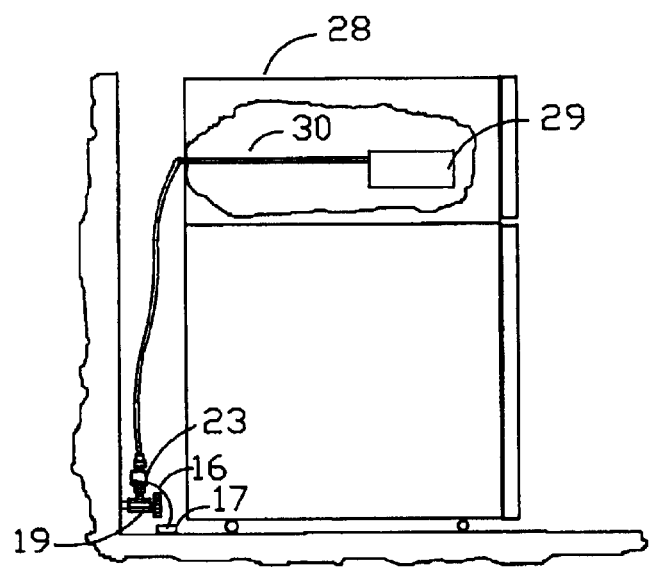
FIG. 4 shows a partial cutaway of a typical refrigerator installation equipped with an automatic ice maker device, along with a water sensor and shutoff valve connected to a water source via a hose or tubing means.

FIGS. 1, 1A, 2, 3, and 4 show typical installations of the water shutoff valve of the present invention. FIG. 1 shows a clothes washing machine 15 with its hot and cold water connections, Valves 14 and 14a represent the hot and cold water valves respectively, normally found on such appliance installations, and which supply water to the clothes washing machine 15. Attached to these valves 14 and 14a are the shutoff valves 13 and 13a to be described herein. Hoses 18 and 18a provide the water connections between the shutoff valves and the hot and cold water inputs to the clothes washing machine. Cables 16 and 16a are used to couple the water sensor assemblies 17 and 17a to the shutoff valves 13 and 13a respectively. FIG. 1A is an enlargement of the above mentioned valve 14, shutoff valve 13, cable 16 and hose 18, and is provided to visually clarify the actual connections. A typical connection used in a dish washer application is not shown since it closely resembles that used on the clothes washing machine with the exception that only one hose connection, namely the hot water line, is used.

FIG. 2 shows a toilet 21 with its reservoir tank 22. A typical installation has a valve 19 that allows a means for turning on and off the source of water necessary for operation. Connected to the top outlet of valve 19 is shutoff valve 23. Although the internal structure of valve 23 is the same as the previously mentioned shutoff valves 13 and 13a, it differs in the fact that the hose connections of valves 13 and 13a are replaced by smaller, threaded connections appropriate for that installation. Hose 20 provides the necessary coupling between the top of shutoff valve 23 and the bottom of the reservoir 22. Cable 16 provides the necessary coupling between the shutoff valve 23 and the water sensor assembly 17.

FIG. 3 shows a partial cutaway view of a typical sink installation in which a sink 24 is mounted in a cabinet 27 with the associated hot and cold faucets 26. Although the side view shows only one faucet connection, it should be understood that the other faucet connection, either hot or cold, is identical to that shown in the foreground. Valve 19, shutoff valve 23, cable 16, and water sensor assembly 17, are identical to that previously described in FIG. 2 and, hence, carry the same number designations. Hose 25 provides the necessary coupling between the top of the shutoff valve 23 and the faucet configuration 26.

FIG. 4 shows a typical refrigerator 28 with a partial cutaway view of the ice cube maker 29 located within the freezer compartment. Tubing 30 connects the ice cube maker to the shutoff valve 23 that is in turn connected to the water valve 19. Cable 16 connects the shutoff valve to the water sensor 17.

Figures 5, 6:
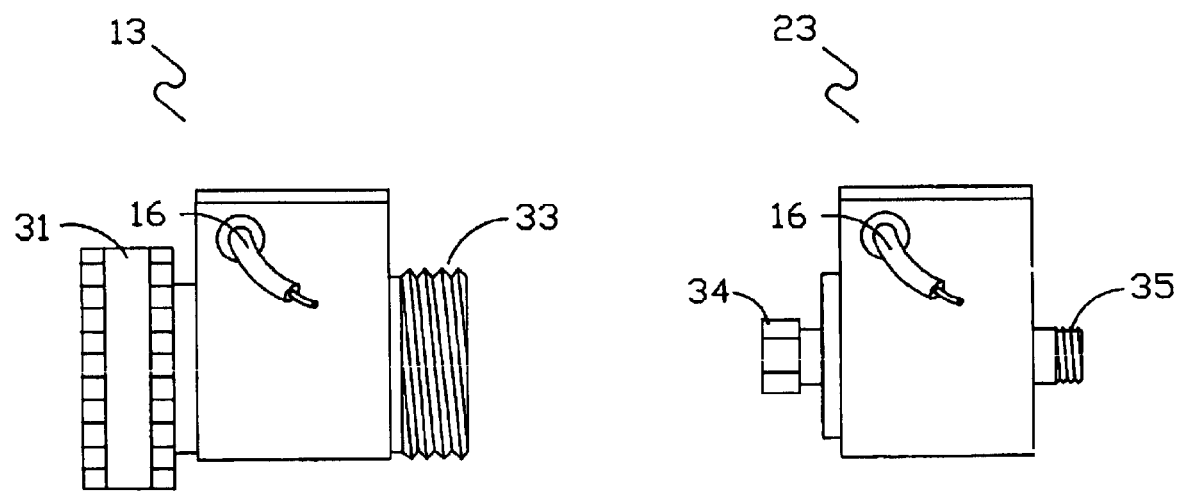
FIG. 5 shows the external view of the shutoff valve used with hose connections on typical dishwashing machine or clothes washing machine installations.
FIG. 6 shows the external view of the shutoff valve used with flexible pipe and hose connections on typical toilet, refrigerators equipped with ice makers, and sink installations.

FIG. 5 shows the outside structure of the shutoff valve 13 shown in FIGS. 1 and 1A. Coupling sleeve 31 is internally threaded, and independently rotatable as might be found on a standard water hose. It provides a means of fastening the shutoff valve to a standard water faucet or water pipe equipped with a hose thread Cable 16 is used to couple the shutoff valve to the associated water sensor assembly, to be described in detail later. Threaded outlet 33 for the shutoff valve 13 provides a means for connecting a hose to the shutoff valve. Such a hose is described in FIG. 1 as items 18 and 18a.

FIG. 6 shows the outside structure of the shutoff valve 23 shown in FIGS. 2–4. As previously mentioned, the only difference between this shutoff valve 23 and that of shutoff valves 13 and 13a is the inlet and outlet connection means. A small, internally threaded and rotatable sleeve 34 provides a means of connecting the shutoff valve 23 to a water source. The standard installation would typically attach the inlet of the shutoff valve 23 to the threaded outlet of a valve 19, Threaded outlet 35 provides a means of attaching the flexible hose 20, 25, and 30 to the appropriate appliances as shown in FIGS. 2, 3, and 4 respectively.

Figure 7:
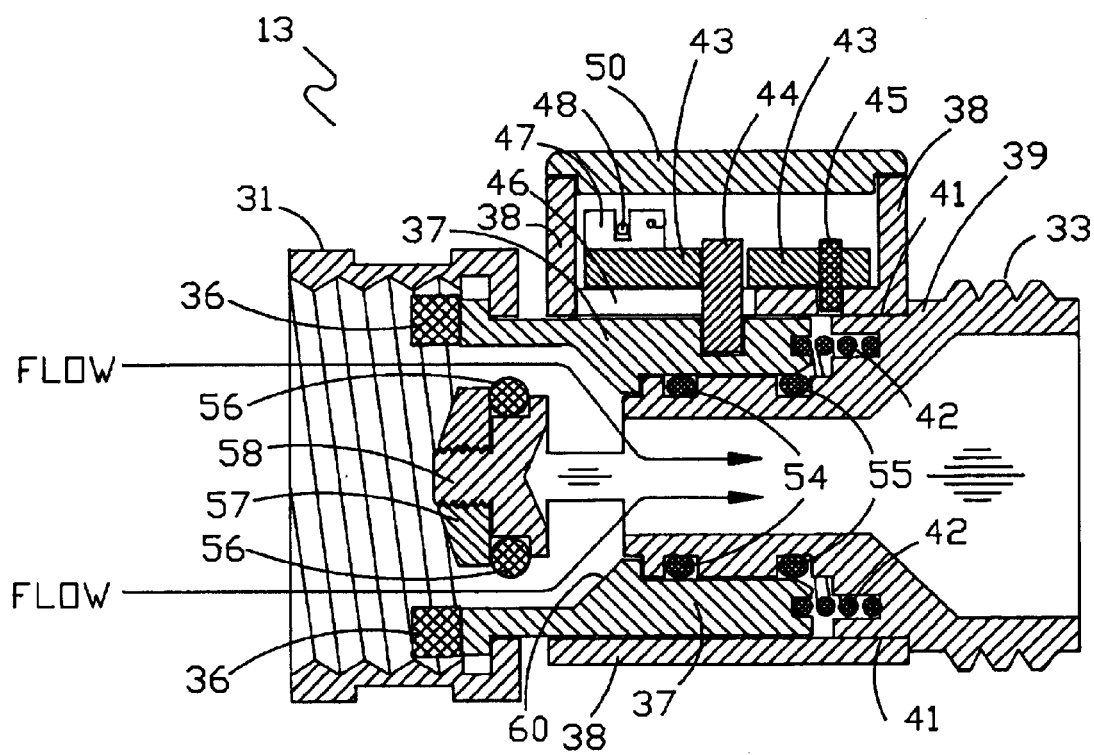
FIG. 7 shows a cross-sectional view of the shutoff valve used with hose connections on typical dishwashing machine or clothes washing machine installations. The valve is shown in an open condition.

FIG. 7 is a cross-sectional view showing the internal structure of the shutoff valve 13 in an open condition allowing water flow through the valve as indicated by the flow arrows. As previously mentioned, threaded coupling sleeve 31 is used to attach the shutoff valve 13 to a faucet or other properly threaded water source. Washer 36 provides a water seal between the input water source and the valve-input sleeve 37. The valve outer housing is comprised of members 38 and 39 and provides an enclosure that is moveable with respect to the valve-input sleeve 37. It should be noted that members 38 and 39 are press fit or threaded together at points 41 to form an integral unit. Member 38 appears three times in FIG. 7 to clarify that it represents a housing that surrounds the valve-input sleeve 37. The position of the valve-input sleeve 37 relative to the enclosure, members 38 and 39, is such that spring 42 is compressed to its shortest axial length. O-rings 54 and 55 provide a primary and secondary moveable water seal respectively between sleeve 37 and member 39. Sealing member 56 is held in place by cap nut 57 that is threaded onto the end post 58 and forms a seal when the valve is closed as will be described later. Sealing member 56 can be an O-ring, a gasket, or any other element that provides a seal when the valve is closed. A flexible hose (18 and 18a in FIG. 1) from an appropriate appliance such as a clothes washing machine can be attached to threaded outlet 33. Such an arrangement allows the moveable valve elements to move with the fluid flow or to the right relative to the fixed elements 31, 36 and 37. In order to prevent the spring 42 from pushing members 38 and 39 to the right relative to sleeve 37 a pin 44 and latch 43 lock these items in the position shown. As will be seen later, latch 43 rotates about pivot pin 45. Because FIG. 7 is a sectional view of the valve assembly latch 43 appears to be two separate entities but in fact it is a single item as will be seen in FIG. 8. Cover 50 protects the latch mechanism.

Figure 8:
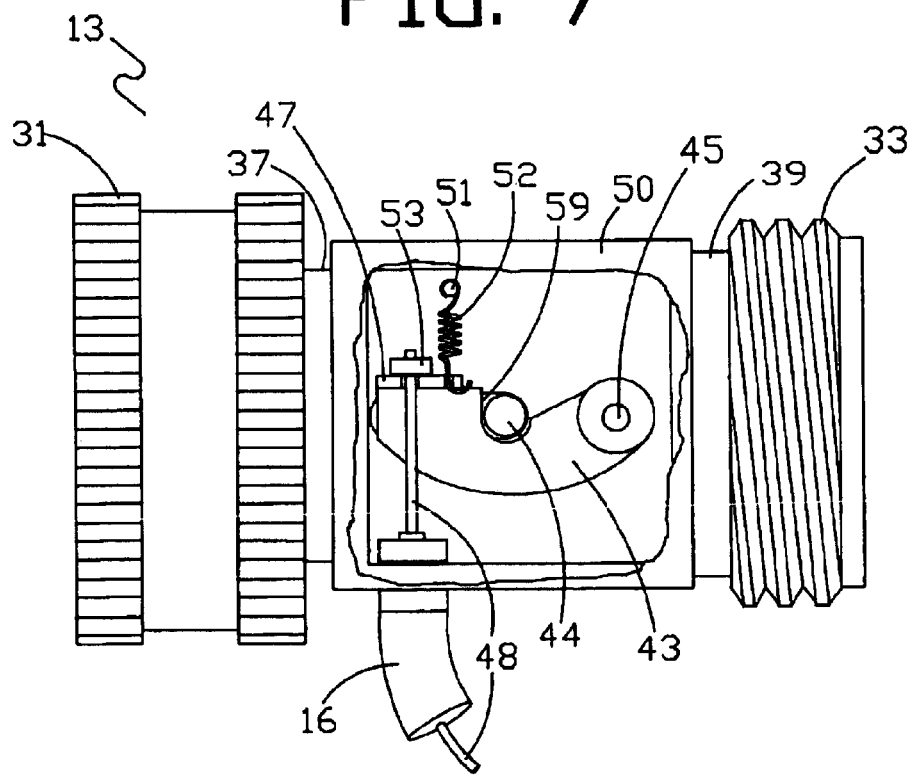
FIG. 8 shows a top view of the shutoff valve with a partial cutaway of the valve activation mechanism when the valve is in an open condition.

FIG. 8 is a top view of the shutoff valve 13 with a partial cutaway view to display the inner parts of the latching system. As can now be clearly seen latch 43 is anchored at pivot pin 45. Surface 59 of latch 43 restricts any right directed movement of threaded outlet 33 and members 38 and 39 relative to threaded coupling sleeve 31 and valve input sleeve 37. Since sleeves 31 and 37 are fastened to a faucet or appropriate valve they should be considered fixed in position. 47 is a vertical extension of latch 43. Spring 52 is attached to extension 47 and anchored at pin 51, thus applying a small force necessary to retain or return the latch 43 in the position shown Cable 16 has an internal wire or other appropriate flexible element 48 that is used to transmit the force from the water sensor 17 to the latch vertical extension 47. This force will be necessary to activate the latch mechanism when valve closure is required. Item 53 clamps around wire 48 to allow the wire to pull on vertical extension 47 and thus the latch 43 when valve closure is required. The water sensor unit will be described later.

Figure 9:
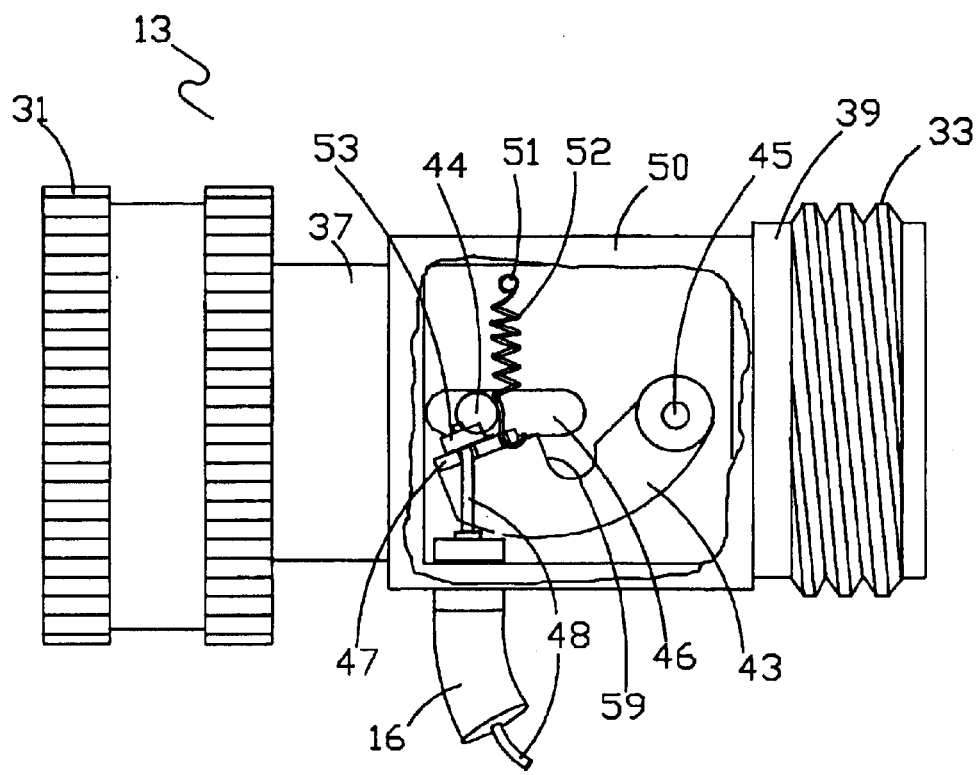
FIG. 9 shows a top view of the shutoff valve with a partial cutaway of the valve activation mechanism when the valve is in a closed condition.

FIG. 9 is a top view of the shutoff valve 13 with a partial cutaway view to display the inner parts of the latching system when the valve is in a closed condition, which happens when a water leak is detected. It can be seen that wire 48 has pulled the vertical extension 47 and thus latch 43 away from pin 44 by rotating about pivot pin 45. Items 33, 39, and all items physically connected to these items then move with the fluid flow or to the right relative to items 31, 37, and pin 44 as a result of the force of spring 42 expanding as shown in FIG. 10.

Figure 10:
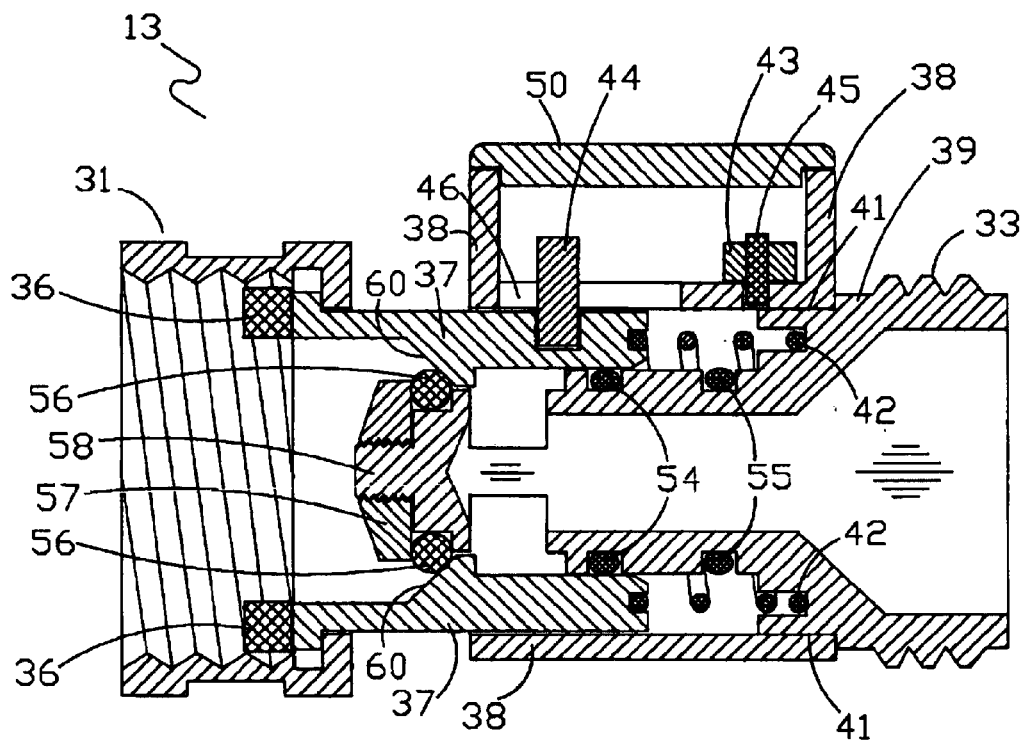
FIG. 10 shows a cross-sectional view of the shutoff valve of FIG. 7 with the valve shown in a closed condition.

FIG. 10 is a cross-sectional drawing showing the internal structure of the shutoff valve 13, which is now in the closed condition. Spring 42 has expanded, providing the force necessary to move the valve to the closed position. It can be seen that items 38, 39 and all physically connected items have moved to the right relative to items 31 and 37, allowing O-ring 56 to seat against the valve surface 60. O-ring 56 is now the primary seal and water flow ceases.

To reset the shutoff valve system to the open position force, such as with a hand, is applied to threaded outlet 33 to move it against the direction of fluid flow or to the left against the pressure of expanded spring 42. This allows spring 52 to pull extension 47 to the position shown in FIG. 8 with the pin 44 against latch surface 59. Water can then flow as shown in FIG. 7.

Figure 11:
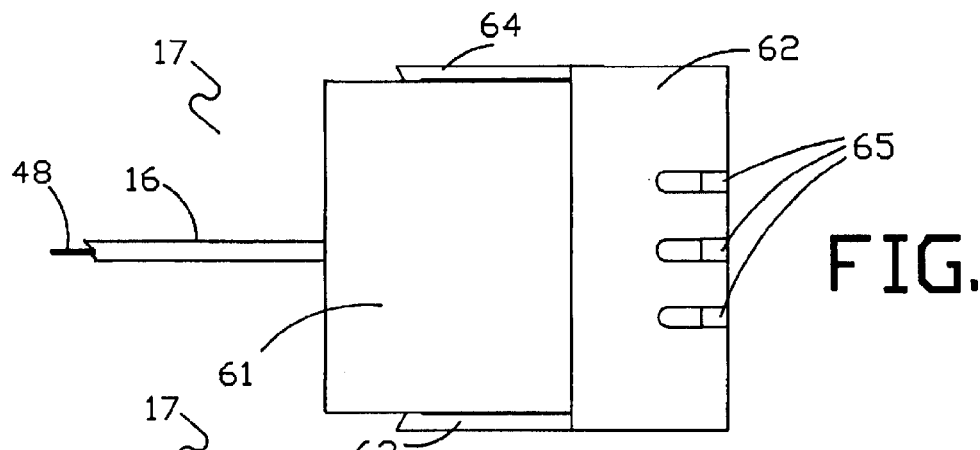
FIG. 11 shows the external, top view of the water sensor assembly.
Figure 11A:
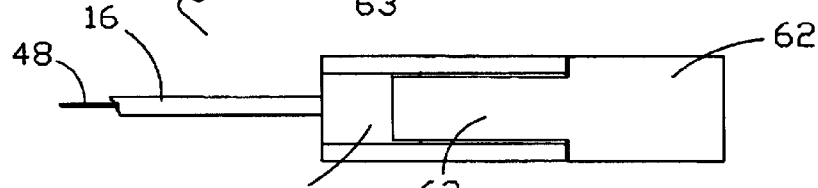
FIG. 11A shows an external, side-elevation view of the water sensor assembly.

FIG. 11 is a top, external view of the water sensor assembly 17. As will be seen later, the enclosure 61 contains a spring and plunger mechanism. Cartridge 62 contains a water-soluble element and is designed to be a replaceable unit attached to the enclosure 61 by means of two clip arms 63 and 64. Openings 65 are provided to allow the passage of fluid, such as water, into the cartridge 62. Cable 16 is as shown in FIGS. 1, 2, 3, and 4 and houses a wire 48 or other appropriate material that transmits the necessary force to pull the latch 43 from its position in FIG. 8 to its position in FIG. 9 when a water leak is detected. FIG. 11A is an elevation side view of the water sensor assembly 17 to give some perspective as to the thickness of the assembly, which could be typically one quarter of an inch. The thickness of the wall of the cartridge 62 containing the water-soluble element would be on the order of thirty thousands of an inch. The thinness of this wall allows entry into the cartridge 62 of very low water levels that might accumulate on the floor or other adjacent surface as a result of water leakage.

Figure 12:
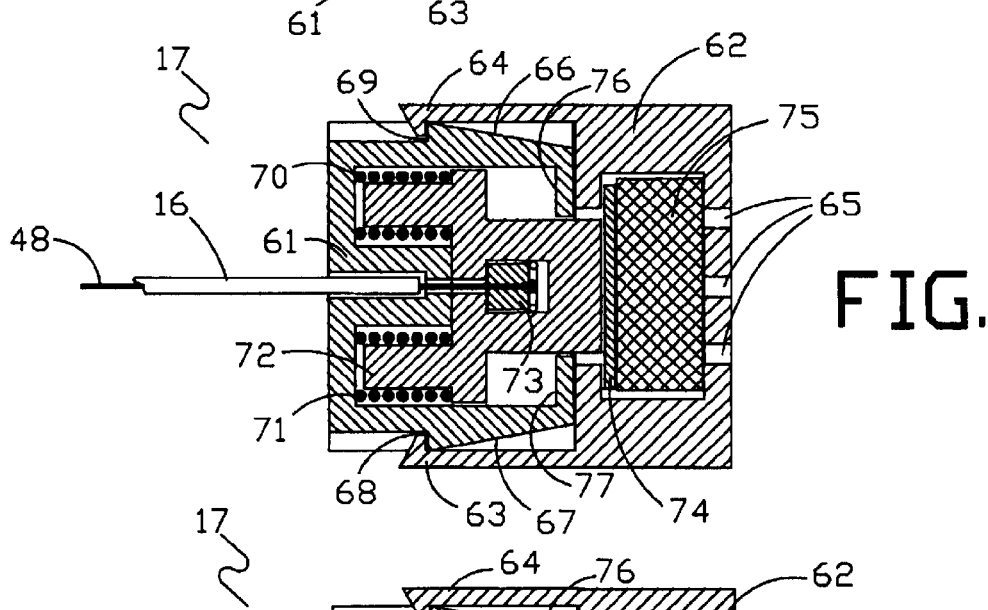
FIG. 12 shows the top, cross-sectional view of the water sensor assembly in a latched, standby state.

FIG. 12 is a top, cross-sectional view of the water sensor assembly 17. Cartridge 62 contains the water-soluble element 75. Plate 74 is a thin, rigid element, which distributes the force from plunger 72 to the surface of the fluid-soluble element 75. Springs 70 and 71 apply an axial force on plunger 72. Tapered surfaces 66 and 67 are provided to allow the clip arms 63 and 64 to slide and bend during engagement of cartridge 62 with enclosure 61. When the hook portion of the clip arms 63 and 64 reach the latch surfaces 68 and 69 respectively they will snap into a position shown, thus retaining the engagement of cartridge 62 with the enclosure 61. Clamp 73 is fastened to the end of wire 48 and rests against the inner slide surface of plunger 72. It can now be seen that, in the configuration of FIG. 12, the water sensor assembly 17 is in a latched state and ready to be triggered when a fluid such as water dissolves the water-soluble element 75.

Figure 12A:
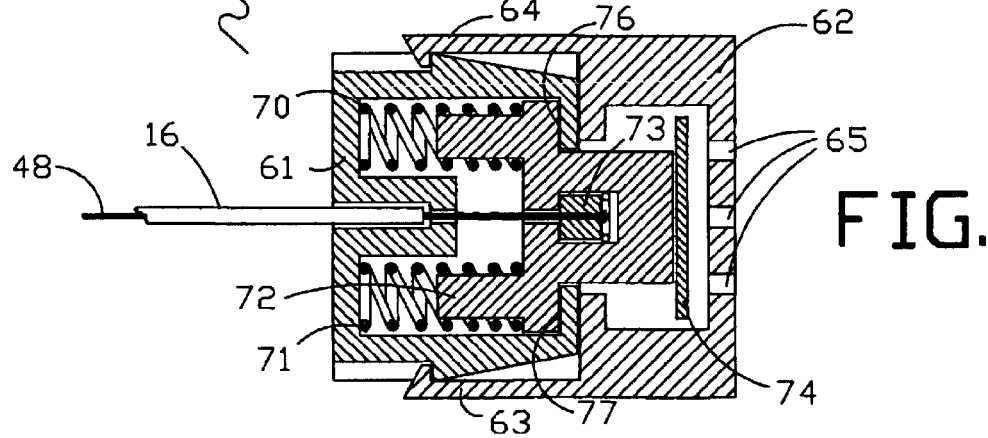
FIG. 12A shows the top, cross-sectional view of the water sensor assembly in an activated state.

FIG. 12A is a top, cross-sectional view of the water sensor assembly 17 in the triggered state. A typical water leakage condition causes water to accumulate on the floor around the appliance. Since the water sensor would be located adjacent to the appliance it would come in contact with the accumulated water. When water enters the water sensor cartridge 62 through openings 65 the water-soluble element 75 dissolves, allowing springs 70 and 71 to expand and move plunger 72 to the right, pulling clamp 73 and wire 48 with it. Surfaces 76 and 77 stop the rightward movement of plunger 72 to limit the movement of wire 48. The other end of wire 48, being connected to the vertical extension 47 of latch 43 in FIG. 9, will pull the latch 43 as shown in FIG. 9 and thus close the valve to stop additional water leakage. Cable tubing 16 encloses wire 48 and provides the necessary axially rigid but flexible connection between the water sensor 17 and the valve 13. As previously mentioned, this initiates the valve closure action and water flow through the valve 13 will cease. After water flow has stopped it is necessary to first find and repair the source of the water leakage, along with drying the area of leakage. Next, the expended sensor cartridge 62 with the dissolved water soluble element is removed and another cartridge, either new or used, containing a new water soluble element 75 is snapped in place. Then the valve 14 or 19, referring to FIG. 1 through FIG. 4, is turned off to relieve water pressure on the shutoff valve 13 or 23 respectively. In order to reset the valve to its open position the portion of the valve housing that had moved to the right during valve closure, namely, 33, 38 and 39 along with the connected appliance hose must be manually pressed in an axial direction toward the water source in order to compress spring 42 to its minimum length. It can be seen that a position of pin 44 will be reached such that spring 52 in FIG. 9 can once again pull the latch 43 back into a locked position. The valve 13 is now in a re-latched, open state and water flow can be reestablished by opening the appropriate valve 14 or 19.

One of the primary, advantages of the described invention relative to the prior art is the ease with which it can be installed without disrupting the existing water supply lines or the water connections to the applicable appliances. When installing the described shutoff valve and sensor to the water sources for a clothes washing machine, the first step is to turn off the faucets or valves 14 and 14A controlling the hot and cold water to the clothes washing machine. Next, the washing machine hoses 18 and 18A are disconnected from the hot and cold water faucets or valves 14 and 14A. One described shutoff valve 13 is now threaded onto the hot water faucet and another shutoff valve 13A is threaded onto the cold water faucet. Then the previously removed washing machine hoses 18 and 18A are threaded onto the threaded outlets 33 of the hot and cold shutoff valves 13 and 13A respectively. The sensor assemblies 17 and 17A are now be placed on the floor adjacent to the washing machine or in a location that optimizes the possibility of detecting any water leakage. Once the water source faucets or valves 14 and 14A are opened to allow flow to the washing machine the installation is complete.

In summary, the foregoing disclosure describes a latched, spring-loaded valve that, in conjunction with a water sensor and an activation mechanism, provides a means to turn off a water supply when a water leak is detected. This disclosure focuses primarily on specific applications such as clothes washing machines, dishwashing machines, toilets, sinks, and refrigerators equipped with ice cube makers, but could apply to appropriate, non-water, fluid-handling applications. Because of its design the present valve system requires no electrical power to function. It should be understood, however, that anyone skilled in the art might provide a switching means to detect when the valve has been shut off, and utilize the switching means to activate an audible or visual alarm. Likewise, the water sensor and associated activation cable could be replaced by an electrical solenoid, controlled by a separate electronic water sensing and control system. In addition, it should be understood that the above valve description should not preclude the incorporation of the valve shutoff system as an integral part of the manual shut off valves which have been designated by items 14, 14a, and 19 in FIGS. 1 through 4. Although a particular type of valve has been used in the description of this invention, it should be understood that other types of valves that do not require axial elongation, such as ball valves, gate valves, check valves or the like, could be used without departing from the spirit of this invention, The description of this invention is illustrative and not limiting; further modifications will be apparent to one skilled in the art, in the light of this disclosure and the appended claims.

What is claimed is:

1. A shutoff valve system with leak detector for automatically shutting off a water supply to appliances such as a clothes washing machine, dish washing machine, sink, toilet, or refrigerator equipped with an ice maker, comprising:

a valve body having an inlet opening and an outlet opening which are in fluid communication, said inlet opening being connected to said water supply and said outlet opening being connected to any of the above-mentioned appliances;

a sealing member movable within said valve body between an open position wherein the sealing member does not block fluid flow, and a closed position wherein the sealing member blocks fluid flow;

a spring loaded outlet associated with said movable sealing member operably coupled to a water supply valve of any one of the above-mentioned appliances;

a latch member which in the closed position restricts any movement of said spring loaded outlet;

a cartridge having a water-soluble element therein;

a cable connecting said cartridge with said latch member; and actuator means within said cartridge which moves said latch member to an open position when said water-soluble element dissolves whereby said spring loaded outlet moves to a position which causes said sealing member to block fluid flow at the inlet opening.

2. The shutoff valve system of claim 1 wherein:

the water-soluble element is in a compression mode.

3. The shutoff valve system of claim 1 wherein:

said cable pulls against a spring loaded latch vertical extension during valve closure.

4. The shutoff valve system of claim 1 wherein:

force is applied to said valve body surrounding said spring loaded outlet to move it to a position which allows the latch member to return to a closed position and the sealing member to an open position.

5. The shutoff valve system of claim 1 wherein:

the actuator means has at least one spring which expands as the water-soluble element dissolves.

6. The shutoff valve system of claim 5 wherein:

the expanding spring moves a plunger attached to the end of said cable.

7. The shutoff valve system of claim 1 wherein:

said cartridge is replaceable.

8. The shutoff valve system of claim 7 wherein:

the water-soluble element is replaceable.

9. The shutoff valve system of claim 1 wherein:

said valve system is incorporated as an integral part of a standard water valve normally used to manually turn on and off the water supply to said appliances.

10. The shutoff valve system of claim 1 wherein:

the sealing member is an O-ring.

* * * * *